United States Patent
Satoda et al.

(10) Patent No.: US 10,298,900 B2
(45) Date of Patent: *May 21, 2019

(54) SYSTEM AND METHOD FOR REDUCING INTRA-CHANNEL INTERFERENCE

(71) Applicant: Entropic Communications, LLC, Carlsbad, CA (US)

(72) Inventors: Dean Naoki Satoda, San Diego, CA (US); Darren E. Smith, San Diego, CA (US)

(73) Assignee: Entropic Communications, LLC, Carlsbad, CA (US)

( * ) Notice: Subject to any disclaimer, the term of this patent is extended or adjusted under 35 U.S.C. 154(b) by 307 days.

This patent is subject to a terminal disclaimer.

(21) Appl. No.: 15/001,906

(22) Filed: Jan. 20, 2016

(65) Prior Publication Data

US 2016/0150206 A1    May 26, 2016

Related U.S. Application Data

(63) Continuation of application No. 12/570,731, filed on Sep. 30, 2009, now Pat. No. 9,282,274.

(60) Provisional application No. 61/219,088, filed on Jun. 22, 2009.

(51) Int. Cl.
*H04N 5/455* (2006.01)
*H04N 9/77* (2006.01)
*H04N 11/14* (2006.01)

(52) U.S. Cl.
CPC .............. *H04N 9/77* (2013.01); *H04N 5/455* (2013.01); *H04N 11/146* (2013.01)

(58) Field of Classification Search
CPC ........ H04N 9/77; H04N 9/7908; H04N 11/146
See application file for complete search history.

(56) References Cited

U.S. PATENT DOCUMENTS

| 4,470,071 | A | * | 9/1984 | Rindal | H04N 5/60 348/737 |
| 5,291,289 | A | * | 3/1994 | Hulyalkar | H04L 5/0007 348/469 |
| 5,465,410 | A | * | 11/1995 | Hiben | H03G 5/24 455/182.2 |
| 5,488,632 | A | * | 1/1996 | Mason | H04L 27/2602 348/E7.038 |
| 5,546,132 | A | | 8/1996 | Kim et al. | |
| 5,550,596 | A | | 8/1996 | Strolle et al. | |

(Continued)

*Primary Examiner* — Brian P Yenke
(74) *Attorney, Agent, or Firm* — McAndrews, Held & Malloy, Ltd.

(57) ABSTRACT

The present invention provides a method for determining a local oscillator frequency for a baseband converter, comprising obtaining characteristics of a channel comprising a plurality of radio signals at corresponding radio frequencies; using the channel characteristics to select a local oscillator frequency to use in baseband conversion of the plurality of radio signals of the channel to form a first baseband converted signal and a second baseband converted signal; and programming a local oscillator to operate the selected local oscillator frequency; wherein the local oscillator frequency is selected such that an image rejection ratio of the baseband converted second signal to an image of the baseband converted first signal is above a predetermined threshold.

13 Claims, 7 Drawing Sheets

(56) References Cited

U.S. PATENT DOCUMENTS

| | | | |
|---|---|---|---|
| 5,742,357 A * | 4/1998 | Griesbaum | H03J 7/02 |
| | | | 348/473 |
| 5,821,988 A | 10/1998 | Citta et al. | |
| 5,923,374 A | 7/1999 | James | |
| 6,304,751 B1 | 10/2001 | King | |
| 6,344,871 B1 | 2/2002 | Liu et al. | |
| 6,437,873 B1 | 8/2002 | Maeda | |
| 6,694,131 B1 | 2/2004 | Lakkis | |
| 6,727,936 B2 | 4/2004 | Liu et al. | |
| 7,030,901 B2 | 4/2006 | Ahn | |
| 7,050,778 B1 * | 5/2006 | Olson | H03D 7/18 |
| | | | 455/226.1 |
| 7,098,967 B2 | 8/2006 | Kanno et al. | |
| 7,218,359 B2 | 5/2007 | Peng et al. | |
| 7,218,539 B2 * | 5/2007 | Ely | H02M 7/48 |
| | | | 363/131 |
| 7,218,862 B2 | 5/2007 | Shahar et al. | |
| 7,239,357 B2 | 7/2007 | Jaffe | |
| 7,239,358 B1 | 7/2007 | Mayer | |
| 7,394,500 B2 | 7/2008 | Zhu et al. | |
| 7,453,526 B2 | 11/2008 | Yun et al. | |
| 7,508,451 B2 | 3/2009 | Sheng et al. | |
| 7,554,609 B2 | 6/2009 | Wang et al. | |
| 7,605,838 B2 * | 10/2009 | Lee | H04B 1/1036 |
| | | | 348/21 |
| 7,783,273 B2 | 8/2010 | Maeda et al. | |
| 8,078,129 B2 | 12/2011 | Lindstrom et al. | |
| 8,169,551 B2 * | 5/2012 | Jiang | H04B 1/1036 |
| | | | 340/607 |
| 8,351,551 B2 * | 1/2013 | Redfern | H04L 25/061 |
| | | | 375/316 |
| 9,184,776 B2 * | 11/2015 | Tryhub | H04B 1/1027 |
| 9,282,274 B2 | 3/2016 | Satoda et al. | |
| 2003/0071925 A1 * | 4/2003 | Kanno | H03D 7/165 |
| | | | 348/726 |
| 2003/0179837 A1 | 9/2003 | Ide et al. | |
| 2004/0132423 A1 * | 7/2004 | Oh | H03D 3/009 |
| | | | 455/323 |
| 2004/0196361 A1 | 10/2004 | Liu et al. | |
| 2004/0257471 A1 | 12/2004 | Kim | |
| 2005/0012865 A1 | 1/2005 | Kim | |
| 2005/0036566 A1 | 2/2005 | Eikenbroek et al. | |
| 2005/0212977 A1 | 9/2005 | Zhu et al. | |
| 2005/0243949 A1 * | 11/2005 | Khoini-Poorfard | |
| | | | H04L 27/364 |
| | | | 375/324 |
| 2006/0055824 A1 | 3/2006 | Zhu et al. | |
| 2006/0146200 A1 | 7/2006 | Edde et al. | |
| 2007/0026831 A1 | 2/2007 | Jaffe et al. | |
| 2007/0064156 A1 | 3/2007 | Liou et al. | |
| 2008/0024660 A1 | 1/2008 | Wang | |
| 2008/0225182 A1 * | 9/2008 | Silver | H04N 5/4401 |
| | | | 348/726 |
| 2009/0115903 A1 | 5/2009 | Zhu et al. | |
| 2009/0273714 A1 | 11/2009 | Liou et al. | |
| 2010/0093295 A1 | 4/2010 | Olson | |
| 2010/0112969 A1 * | 5/2010 | Ikeda | H03J 1/005 |
| | | | 455/188.1 |
| 2010/0284494 A1 | 11/2010 | Belotserkovsky | |
| 2010/0304677 A1 * | 12/2010 | Pop | H04B 1/28 |
| | | | 455/42 |
| 2010/0306814 A1 | 12/2010 | Gatta | |
| 2011/0171919 A1 * | 7/2011 | Tryhub | H04B 1/1027 |
| | | | 455/193.1 |
| 2013/0088647 A1 * | 4/2013 | Zhou | H04L 25/061 |
| | | | 348/731 |

* cited by examiner

SYSTEM AND METHOD FOR REDUCING INTRA-CHANNEL INTERFERENCE

CROSS-REFERENCE TO RELATED APPLICATIONS

This application is a continuation patent application of U.S. Ser. No. 12/570,731, filed Sep. 30, 2009, which claims the benefit of U.S. Provisional Application Ser. No. 61/219,088, filed Jun. 22, 2009. The above-referenced United States patent applications are all hereby incorporated by reference in their entirety.

TECHNICAL FIELD

The present invention relates generally to radio communication, and more particularly, some embodiments relate to radio reception and radio channel tuning.

DESCRIPTION OF THE RELATED ART

Oftentimes, a radio channel, such as an NTSC television channel comprises a plurality of signals. For example, the NTSC television channel comprises a luma signal carrying information about the luminance of the picture, a chroma signal carrying information about the chrominance of the picture, and an audio signal carrying information about the audio that accompanies the picture. Moreover, these signals will generally occur relatively close to each other within the frequency spectrum. These signal characteristics may sometimes impede baseband conversion in direct down conversion receivers.

Many radio receivers convert a radio signal to a baseband signal using signal mixing with a local oscillator frequency. In this process a baseband signal with a frequency after mixing, Fbb, can be produced by two signals which are offset from the LO frequency by +/− Fbb. One of these signals is typically termed the desired signal while the other signal is typically termed the image signal. In direct down-conversion receivers the image signal is rejected by utilizing IQ downconversion with the amount of rejection determined by the phase and amplitude balance of the I and Q signal paths. The image rejection ratio is a measurement of the ratio of the signal level of the desired input signal to the image signal and is typically measured in decibels. If the image rejection ratio is less than a system specific threshold then the interference due to the image is detected.

In a direct down conversion receiver system having a plurality of signals within a channel, the image of one of the channel signals may interfere with the desired or input signal of the other channel signal. For example, the image of the luma carrier may potentially interfere with the chroma carrier. Having the luma image frequency land on the chroma carrier can cause visible video picture artifacts if there is insufficient image rejection. In some environments, for there to be no degradation of the video picture, the image rejection should be approximately 68 to 70 dB. Such image rejection can be very difficult to attain, especially in direct down architecture tuners that are developed on an integrated circuit with minimal external components.

BRIEF SUMMARY OF EMBODIMENTS OF THE INVENTION

Various embodiments of the disclosed method and apparatus for channel equalization are presented. Some of these embodiments are directed toward systems and methods for offsetting the Local Oscillator (LO) that converts from Radio Frequency (RF) to baseband by an amount that guarantees or increases the likelihood that the image of the National Television System Committee (NTSC) luma carrier does not land on the chroma carrier. The offset takes into account that a crystal frequency can drift +/−50 ppm (parts/million). Alternative embodiments can include greater latitude for the drift of the frequency generator. The LO is offset from the normal channel center by −0.25 MHz. The choice to offset the LO by −0.25 MHz rather than +0.25 MHz allow for better image rejection than would result in the alternative.

After offsetting the LO, the frequency is adjusted at a later stage to keep the final baseband frequency of the luma carrier the same as if no LO frequency offsetting was performed. In one embodiment, this is done with a digital frequency shift. The frequency shift occurs before channel filtering so the channel filters see the same luma, chroma and audio spectrum as if the LO frequency were not offset.

The disclosed method and apparatus does not require any change in filtering (anti alias filtering, channel filtering or reconstruction filtering). The end user does not require any knowledge of the frequency offset since the algorithm is self contained in the end user software driver.

According to an embodiment of the invention, a method for determining a local oscillator frequency for a baseband converter comprises obtaining characteristics of a channel comprising a plurality of radio signals at corresponding radio frequencies, using the channel characteristics to select a local oscillator frequency to use in baseband conversion of the plurality of radio signals of the channel to form a first baseband converted signal and a second baseband converted signal; and programming a local oscillator to operate at the selected local oscillator frequency; wherein the local oscillator frequency is selected such that an image rejection ratio of the baseband converted second signal to an image of the baseband converted first signal is above a predetermined threshold.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION OF THE EMBODIMENTS OF THE INVENTION

The present invention is directed toward a system and method for providing a local oscillator frequency for use in direct downconversion of radio signals. In one embodiment, intra-channel interference caused by the image signal is avoided or reduced by selecting an off-center local oscillator frequency. This local oscillator frequency may be further selected to avoid or mitigate undue attenuation of signals located near the periphery of the channel.

Figure 1:
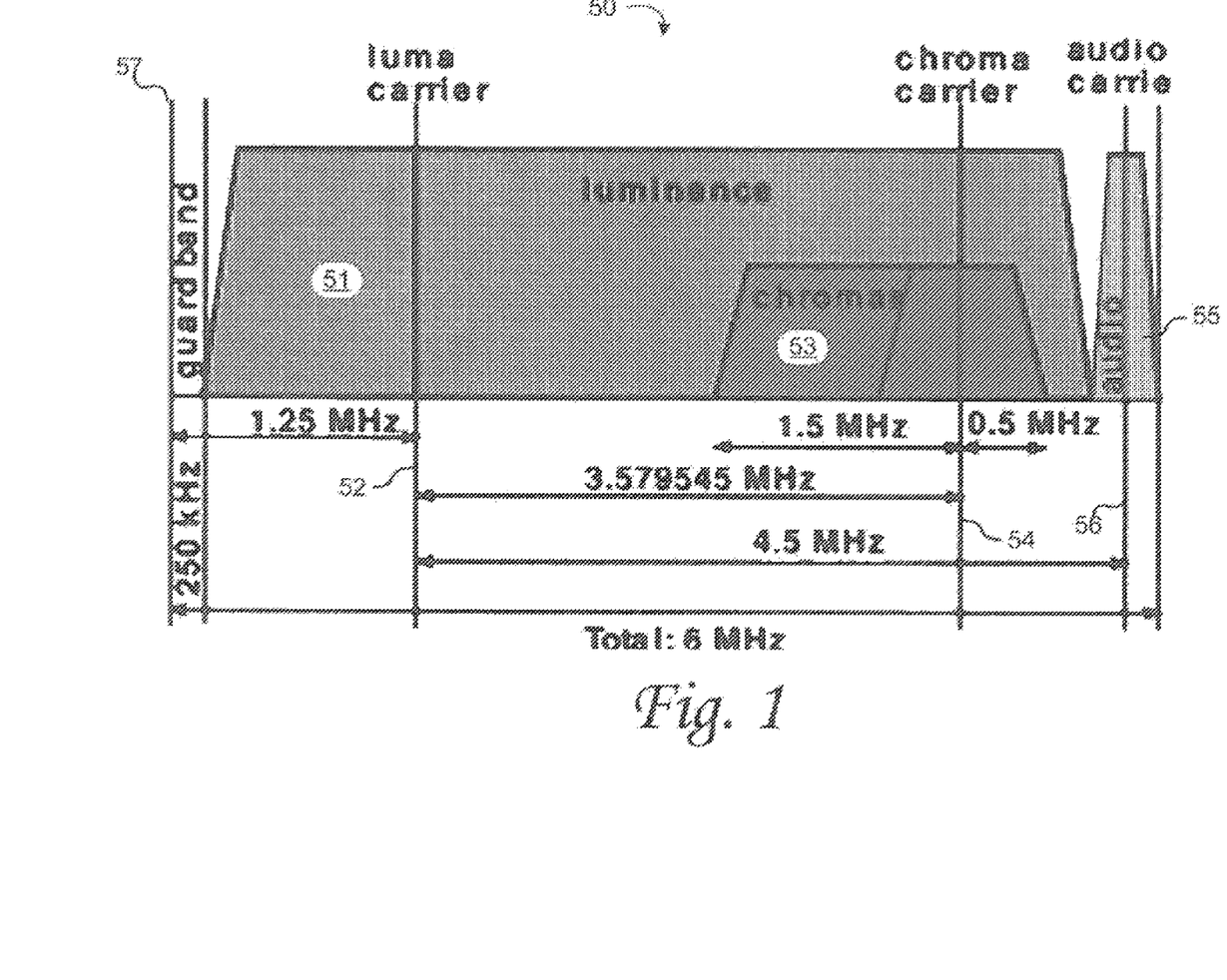
FIG. 1 illustrates an example environment in which an embodiment of the invention may be employed.

Before describing the invention in detail, it is useful to describe an example environment with which the invention can be implemented. One such example is that of a television receiver. More particularly, the example environment comprises a television tuner configured to receive NTSC television channels. Such an NTSC television channel is illustrated in FIG. 1. NTSC television channels 50 comprise 6 MHz blocks of radio frequencies within the radio frequency band of approximately 30 MHz to approximately 900 MHz. An NTSC television channel comprises a luminance signal 51, a chrominance signal 53, and an audio signal 55. The luminance signal is amplitude modulated onto a luma carrier 52 having a frequency 1.25 MHz greater than the starting frequency of the 6 MHz channel 50. The chrominance signal 53 is quadrature amplitude modulated onto a chroma carrier 54 having a frequency of approximately 3.58 MHz greater than the frequency of the luma carrier 52. The audio signal 55 is frequency modulated onto an audio carrier 56 having a frequency approximately 4.5 MHz greater than that of the luma carrier 52.

From time-to-time, the present invention is described herein in terms of these example environments. Description in terms of these environments is provided to allow the various features and embodiments of the invention to be portrayed in the context of an exemplary application. After reading this description, it will become apparent to one of ordinary skill in the art how the invention can be implemented in different and alternative environments.

Figure 2:
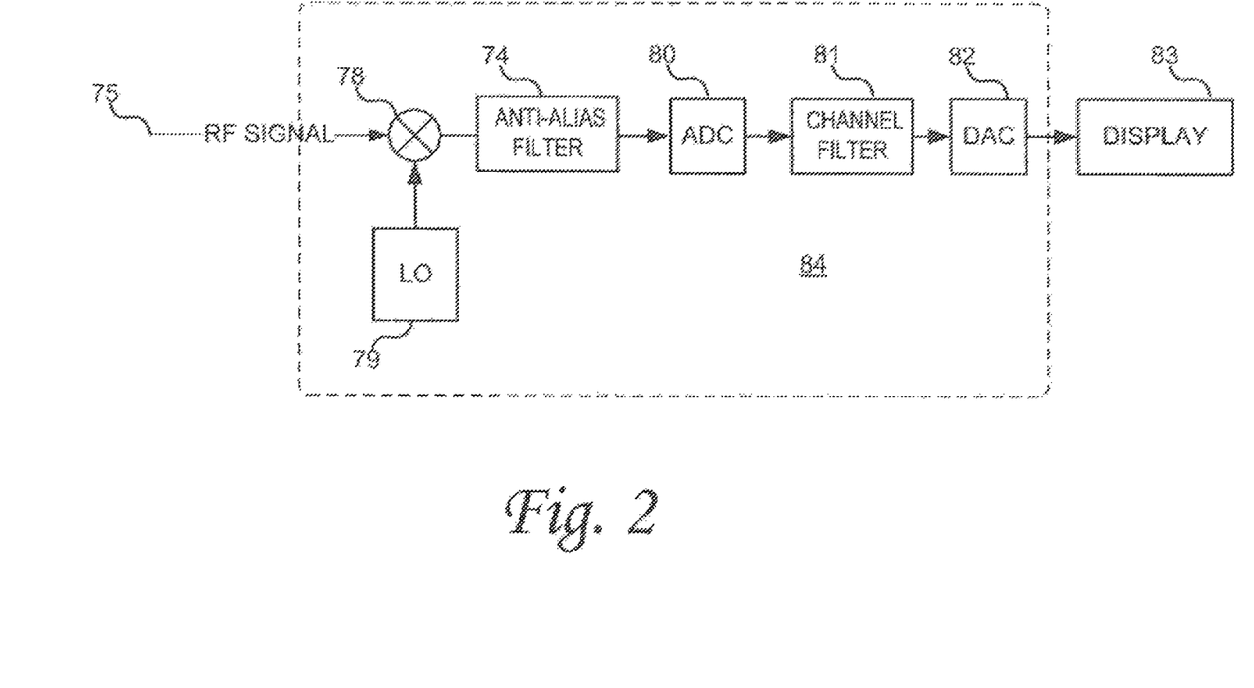
FIG. 2 illustrates a radio receiver and channel tuner operating according to an embodiment of the invention.

FIG. 2 illustrates a radio receiver and channel tuner operating according to an embodiment of the invention. In this embodiment, tuner module 84 receives a radio frequency signal 75 and provides it to mixer 78 for conversion to a baseband frequency using a local oscillator frequency provided by a local oscillator module 79. In this embodiment, the local oscillator frequency provided by the local oscillator module 79 may not remain consistent during normal operation. For example a local oscillator module 79 may have a certain degree of frequency drift during a typical operating period. For example, a local oscillator may have a frequency drift of approximately 50 ppm during a typical operating period. In these circumstances, some channels may have characteristics such that the image of one signal within the channel may unacceptably interfere with the baseband desired signal of other signals in the channel. For example, in the environment illustrated with respect to FIG. 1, with a local oscillator frequency at the channel center of 3 MHz, using a local oscillator 79 having a frequency drift of approximately 50 ppm may result in the image of the luma carrier interfering with the desired chroma carrier. In some embodiments, this interference may be large enough that an image rejection ratio is less than a predetermined system threshold. For example, in the NTSC channel environment the image rejection ratio might not exceed 68 to 70 dB, thereby causing noticeable video artifacts to the naked eye. Accordingly, as described herein the local oscillator frequency may be adjusted or chosen such that this interference does not occur or is reduced.

After baseband conversion at mixer 78, the basesband signal is filtered by the anti-alias filter 74. Because the local oscillator signal has been properly selected, this filtering does not unacceptably attenuate the audio signal. After filtering, the baseband converted signal is provided to analog-to-digital conversion module 80 where the baseband converted signal is converted to a baseband digital signal. The baseband digital signal is provided to filter module 81, wherein the desired channel is filtered from the remainder of the baseband digital signal. The filtered channel is further processed and provided to a digital to analog converter module 82 for output according to the desired system needs. For example, the output channel may be displayed on a display 83.

Figure 3:
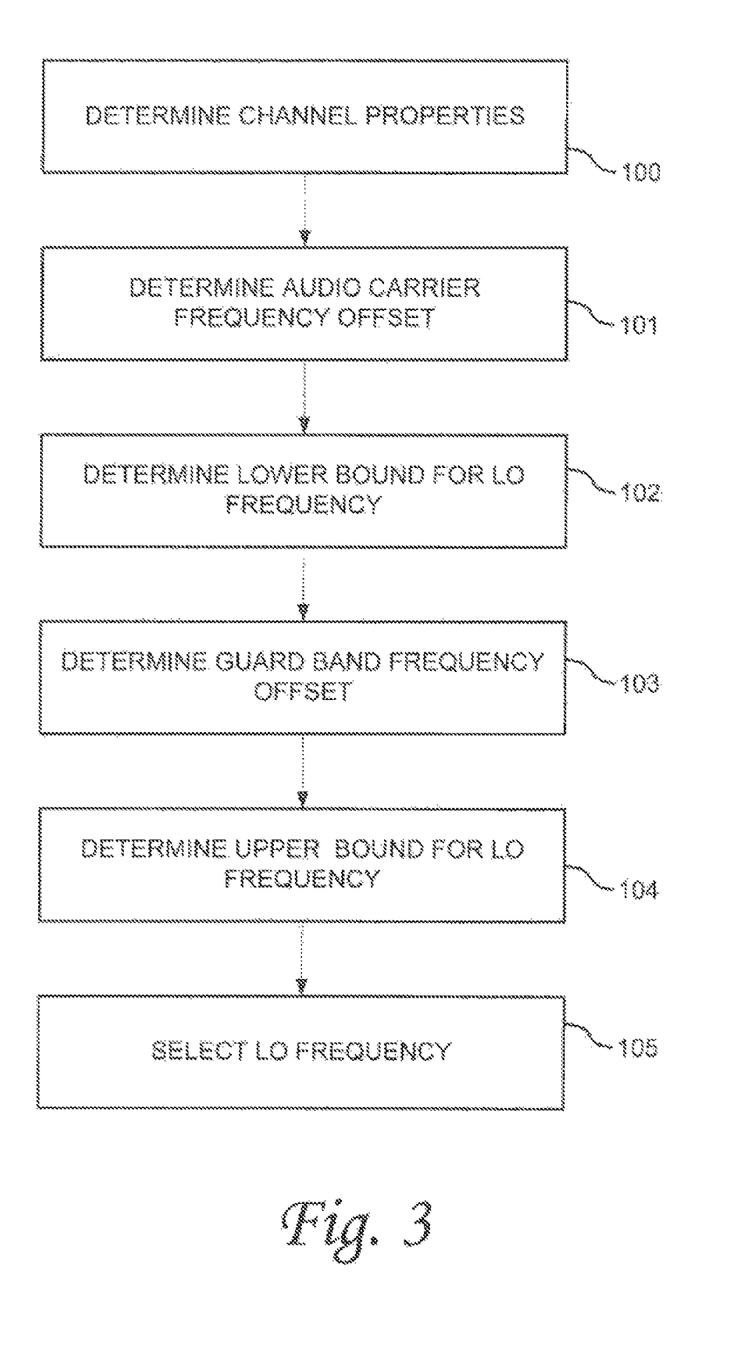
FIG. 3 illustrates a method of selecting a local oscillator frequency according to an embodiment of the invention in a environment where a channel comprises a plurality of signals.

FIG. 3 illustrates a method of selecting a local oscillator frequency according to an embodiment of the invention in a environment where a channel comprises a plurality of signals. In step 100, the channel properties of the radio signals to be received are determined and evaluated. For example, channel widths, frequencies of carrier signals within the channels, locations of the channels within the radio frequency spectrum, and modulation characteristics may be determined. In the illustrated embodiment, the audio carrier has the highest frequency of the signals within a particular channel. Accordingly, in step 101 the frequency offset of the audio carrier is determined. In this embodiment, the audio carrier is used to determine the lower bound for the local oscillator frequency because if the local oscillator frequency is selected to be too low, the audio signal may be unacceptably attenuated. In step 102, the audio carrier frequency is used to determine the lower bound for potential local oscillator frequencies. For example, this lower bound may be determined according to a tolerable amount of attenuation of the audio signal that would occur due to anti-alias filter attenuation if potential local oscillator frequency resulting in an audio carrier at that lower bound were to be used.

In step 103, the guard band frequency of the channel is determined, for use in determining an upper bound for the local oscillator frequency. In step 104 the upper bound for the potential local oscillator frequency is determined using the guard band frequency offset. For example, potential local oscillator frequencies may be evaluated to determine if an adjacent channel would intolerably interfere with reception of the particular channel after baseband conversion using the potential local oscillator frequency.

Once an upper and lower bound for potential local oscillator frequencies are determined, in step 105, the specific local oscillator frequency used for operation is selected. In some embodiments, this local oscillator frequency may be selected arbitrarily within the upper and lower bounds, for example according to system behavior under a plurality of tests at different local oscillator frequencies. In other embodiments, rather than determining both upper and lower bounds for local oscillator frequencies, only one of an upper bound or a lower bound may be determined. For example, it may be determined that it is preferable to reduce a local oscillator frequency as compared to a center channel frequency. Accordingly, in this scenario it is not necessary to determine an upper bound for potential local oscillator frequencies, and this step may be foregone.

Figure 4:
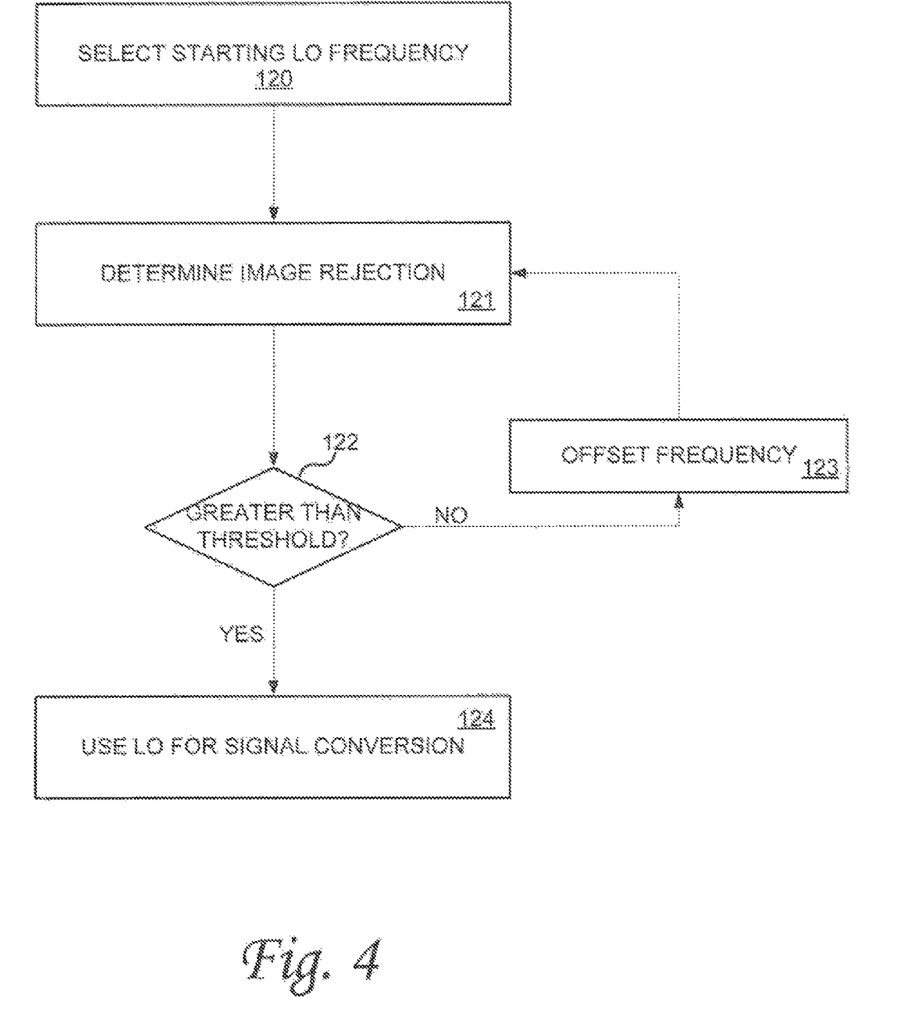
FIG. 4 illustrates an iterative approach to selecting a local oscillator frequency according to an embodiment of the invention.

FIG. 4 illustrates an iterative approach to selecting a local oscillator frequency according to an embodiment of the invention. In this embodiment, a starting local oscillator frequency is selected at step 120. For example, in one embodiment of the starting local oscillator frequency may comprise a center channel frequency. As a further example, in the NTSC television signal environment described with respect to FIG. 1, a center channel of approximately 3 MHz may be selected. In step 121, the image rejection that results using this initial local oscillator frequency for baseband conversion is determined. For example, an experimental system may be used to determine if image rejection goes below a predetermined threshold during operation under normal conditions and normal frequency drift. If the selected local oscillator frequency results in an image rejection ratio greater than the predetermined threshold 122, then the local oscillator frequency is used for signal conversion 124. Otherwise, the frequency is offset at step 123 by a predetermined amount. For example, varying local oscillator frequencies at 0.05 MHz intervals may be iteratively evaluated. Alternatively, a continuous spectrum of local oscillator frequencies may be evaluated to determine one or more appropriate local oscillator frequencies for system use. This method then repeats—starting with step 121—until an appropriate local oscillator frequency is determined.

Figure 5:
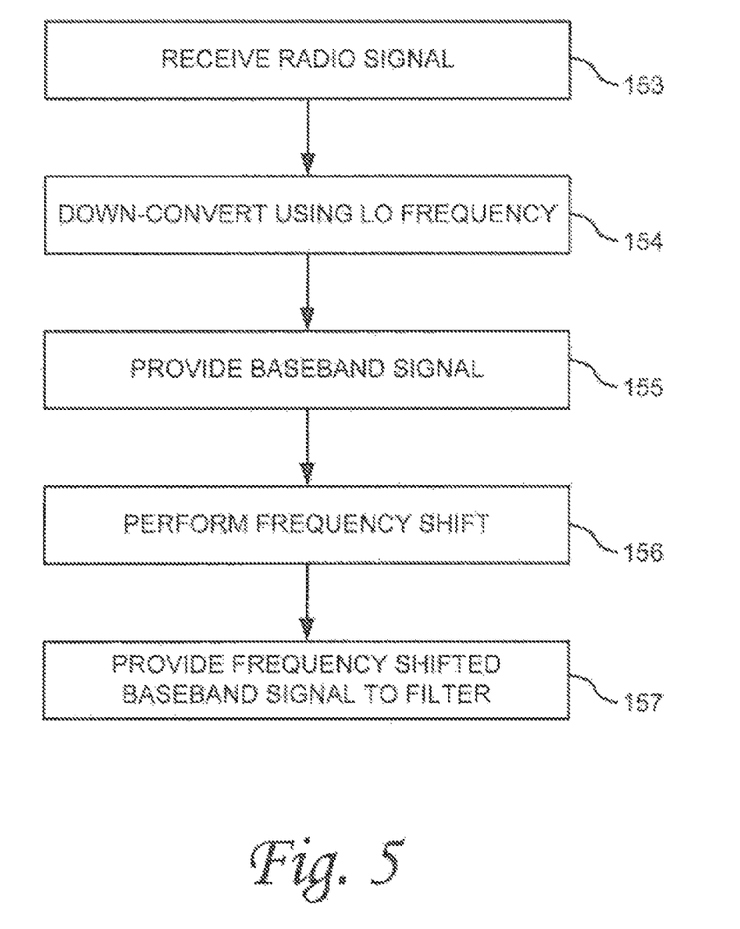
FIG. 5 illustrates a method of system operation according to an embodiment of the invention.

FIG. 5 illustrates a method of system operation according to an embodiment of the invention. In step 153, a radio signal comprising a plurality of channels is received. In step 154, this signal is downconverted directly to baseband using a local oscillator frequency configured such that an image rejection ratio for system operation remains above a predetermined threshold. As described herein, such a local oscillator frequency may be determined using various channel, signal, and implementation specific characteristics. For example, in one embodiment the local oscillator frequency comprises a frequency within a range of 0.1 MHz to 0.4 MHz above or below a center channel frequency. More particularly, the local oscillator frequency may comprise a frequency of 0.25 MHz above or below the center channel frequency. In a specific embodiment, the local oscillator frequency comprises a frequency of 0.25 MHz below the center channel frequency.

Once the radio signal is directly downconverted to baseband using the configured local oscillator frequency, in step 155 the baseband signal is provided to a receiver module. In some embodiments such a receiver module may comprise a channel filter that is preconfigured to filter channels that are downconverted using a local oscillator frequency at channel center. Accordingly, to provide a properly configured baseband signal to such a preconfigured channel filter, at step 156 the baseband frequencies are shifted by an appropriate amount for presentation to the channel filter. For example, in the embodiment where the oscillator frequency comprises the frequency 0.25 MHz below the center channel frequency, the frequency shift may comprise shifting the baseband signal 0.25 MHz higher. After the baseband frequency is appropriately shifted, the signal is presented to the channel filter 157 for channel filtration and further use in the receiver system. For example, some receiver architectures may provide an up conversion system where the channel signal is up converted to an intermediate frequency (IF) after filtration for use in systems configured to utilize IF signals.

Figure 6:
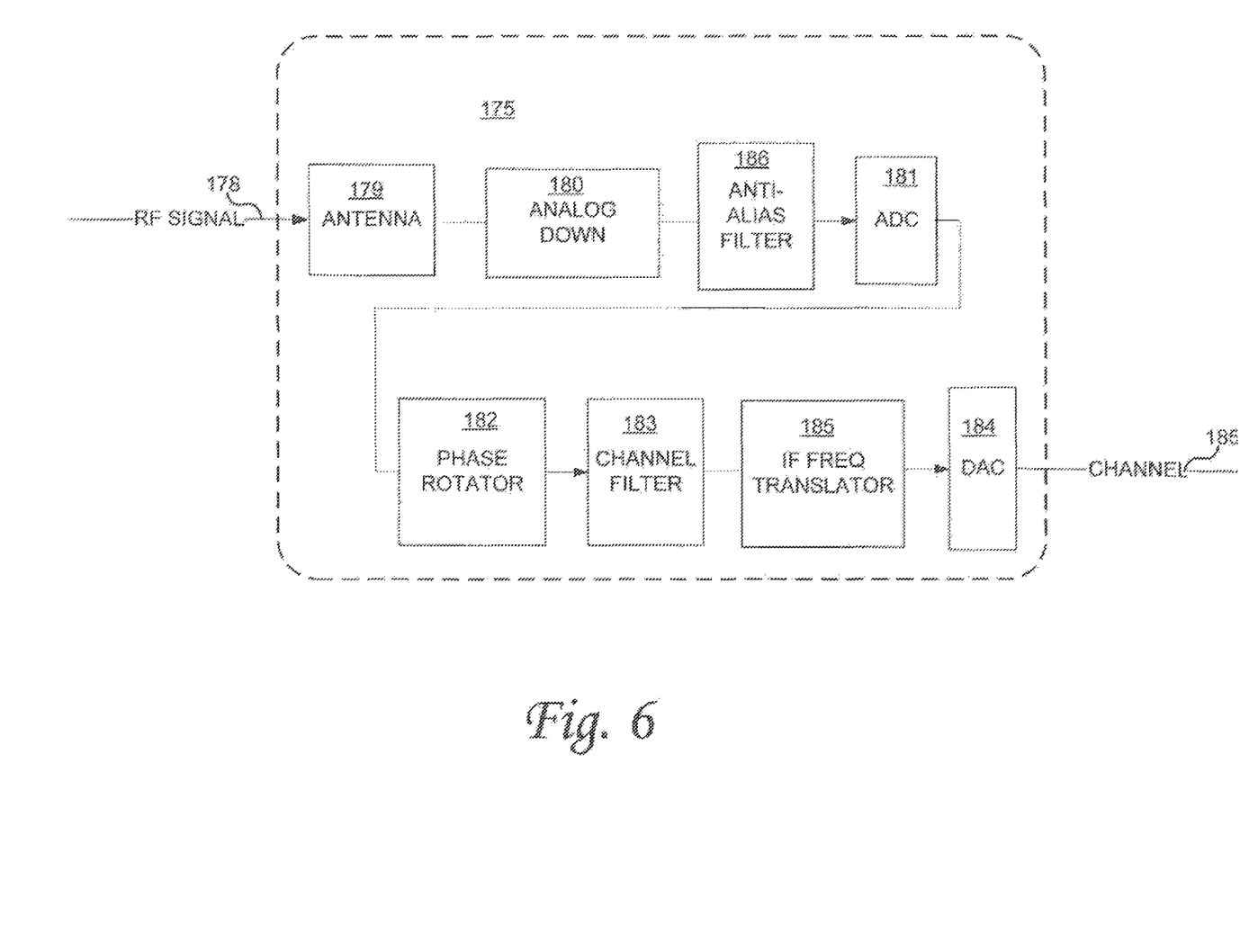
FIG. 6 illustrates a radio receiver apparatus according to an embodiment of the invention.

FIG. 6 illustrates a radio receiver apparatus according to an embodiment of the invention. In this embodiment, receiver module 175 comprises an antenna 179 that is configured to receive an RF signal 178. Receiver module 175 further comprises a down conversion module 180, such as an analog downconverter that uses a heterodyne process to mix the RF signal 178 with a signal tone at a local oscillator frequency. Receiver module 175 further comprises an anti-alias filter 186 configured to filter the down converted signal to avoid out of band signals aliasing in band due to the ADC sampling process. Receiver module 175 further comprises an analog to digital conversion module 181 that is configured to receive the anti-alias filtered and downconverted baseband signal and provide it to phase rotator 182. As described herein, the local oscillator frequency, and hence the downconverted baseband signal, may be offset from the channel center by a predetermined frequency. However, a channel filter 183 may be configured to receive signals only at a frequency corresponding to a local oscillator at channel center. Accordingly a phase rotator module 182 is configured to modify the frequency of the baseband converted signal for use in the channel filter module 183. After phase rotation, the modified signal is provided to a channel filter module 183. Channel filler module 183 is configured to filter the desired channel from the signal and provide it to the rest of the digital signal processing functions and to digital to analog conversion module 184. In this embodiment, receiver module 175 is configured to output the filtered IF converted channel 185 for further system use.

Figure 7:
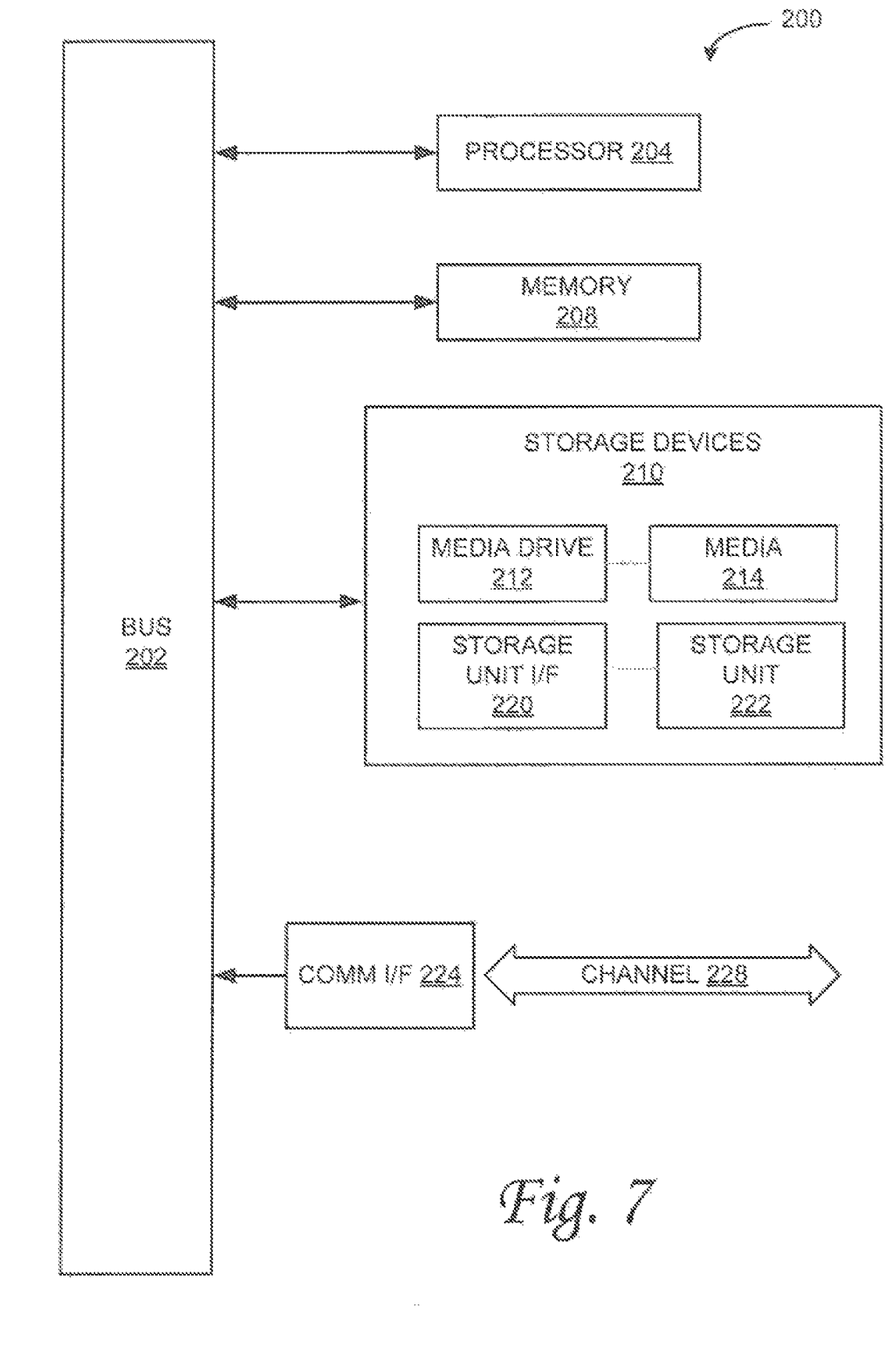
FIG. 7 illustrates an example computing module that may be used in implementing various features of embodiments of the invention.

As used herein, the term module might describe a given unit of functionality that can be performed in accordance with one or more embodiments of the present invention. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the invention are implemented in whole or in part using software, in one embodiment, these software elements can be implemented to operate with a computing or processing module capable of carrying out the functionality described with respect thereto. One such example computing module is shown in FIG. 7. Various embodiments are described in terms of this example-computing module 200. After reading this description, it will become apparent to a person skilled in the relevant art how to implement the invention using other computing modules or architectures.

Referring now to FIG. 7, computing module 200 may represent, for example, computing or processing capabilities found within desktop, laptop and notebook computers; hand-held computing devices (PDA's, smart phones, cell phones, palmtops, etc.); mainframes, supercomputers, workstations or servers; or any other type of special-purpose or general-purpose computing devices as may be desirable or appropriate for a given application or environment. Computing module 200 might also represent computing capabilities embedded within or otherwise available to a given device. For example, a computing module might be found in other electronic devices such as, for example, digital cameras, navigation systems, cellular telephones, portable computing devices, modems, routers, WAPs, terminals and other electronic devices that might include some form of processing capability.

Computing module 200 might include, for example, one or more processors, controllers, control modules, or other processing devices, such as a processor 204. Processor 204 might be implemented using a general-purpose or special-purpose processing engine such as, for example, a microprocessor, controller, or other control logic. In the illustrated example, processor 204 is connected to a bus 202, although any communication medium can be used to facilitate interaction with other components of computing module 200 or to communicate externally.

Computing module 200 might also include one or more memory modules, simply referred to herein as main memory 208. For example, preferably random access memory (RAM) or other dynamic memory, might be used for storing information and instructions to be executed by processor 204. Main memory 208 might also be used for storing temporary variables or other intermediate information during execution of instructions to be executed by processor 204. Computing module 200 might likewise include a read only memory ("ROM") or other static storage device coupled to bus 202 for storing static information and instructions for processor 204.

The computing module 200 might also include one or more various forms of information storage mechanism 210, which might include, for example, a media drive 212 and a storage unit interface 220. The media drive 212 might include a drive or other mechanism to support fixed or removable storage media 214. For example, a hard disk drive, a floppy disk drive, a magnetic tape drive, an optical disk drive, a CD or DVD drive (R or RW), or other removable or fixed media drive might be provided. Accordingly, storage media 214 might include, for example, a hard disk, a floppy disk, magnetic tape, cartridge, optical disk, a CD or DVD, or other fixed or removable medium that is read by, written to or accessed by media drive 212. As these examples illustrate, the storage media 214 can include a computer usable storage medium having stored therein computer software or data.

In alternative embodiments, information storage mechanism 210 might include other similar instrumentalities for allowing computer programs or other instructions or data to be loaded into computing module 200. Such instrumentalities might include, for example, a fixed or removable storage unit 222 and an interface 220. Examples of such storage units 222 and interfaces 220 can include a program cartridge and cartridge interface, a removable memory (for example, a flash memory or other removable memory module) and memory slot, a PCMCIA slot and card, and other fixed or removable storage units 222 and interfaces 220 that allow software and data to be transferred from the storage unit 222 to computing module 200.

Computing module 200 might also include a communications interface 224. Communications interface 224 might be used to allow software and data to be transferred between computing module 200 and external devices. Examples of communications interface 224 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 224 might typically be carried on signals, which can be electronic, electromagnetic (which includes optical) or other signals capable of being exchanged by a given communications interface 224. These signals might be provided to communications interface 224 via a channel 228. This channel 228 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to media such as, for example, memory 208, storage unit 220, media 214, and channel 228. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 200 to perform features or functions of the present invention as discussed herein.

While various embodiments of the present invention have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present invention. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

The invention claimed is:

1. A method of receiving a channel, comprising:
   receiving a radio signal comprising a plurality of channels, a channel of the plurality comprising a first signal and a second signal;
   converting the radio signal to an information bearing signal using a local oscillator, the information bearing signal comprising a converted first signal and a converted second signal, the local oscillator having a local oscillator frequency that is iteratively selected until an image rejection ratio of the converted second signal to an image of the converted first signal is above a predetermined threshold; and
   digitally shifting the frequency of the information bearing signal by an amount approximately equal to the difference between a channel center frequency and the local oscillator frequency.

2. The method of claim 1, wherein the local oscillator frequency is iteratively selected from a range of possible frequencies, the range of possible frequencies having an upper bound and a lower bound determined according to the channel characteristics.

3. The method of claim 2, wherein the channel comprises a television channel; and wherein the lower bound is determined according to a predetermined amount of tolerable attenuation of an audio signal of the channel; and the upper bound is determined according to a predetermined amount of tolerable interference from a video signal of an adjacent channel.

4. The method of claim 1, wherein a new local oscillator frequency is selected if the local oscillator undergoes a predetermined amount of oscillator drift.

5. The method of claim 1, wherein the channel occupies a 6 MHz range of radio spectrum between 30 MHz and 900 MHz, the potential local oscillator frequency comprises a frequency approximately 3 MHz greater than a lowest frequency of the channel, and the selected local oscillator frequency comprises a frequency 0.25 MHz less than the potential local oscillator frequency.

6. The method of claim 5, wherein:
   the channel comprises an NTSC television channel;
   the first signal comprises an luma signal having a carrier frequency 1.25 MHz greater than the lowest frequency of the channel;
   the second signal comprises a chroma signal having a carrier frequency approximately 3.58 MHz greater than the carrier frequency of the luma signal; and
   the channel further comprises an audio signal having a carrier frequency 4.5 MHz greater than the carrier frequency of the luma signal.

7. An apparatus for channel tuning, comprising:
   a signal receiver configured to receive a radio signal comprising a plurality of channels, a channel of the plurality comprising a first information bearing signal and a second information bearing signal;
   a local oscillator configured to provide a local oscillator frequency that is iteratively selected such that an image rejection ratio of the second information bearing signal to an image of the first information bearing signal is above a predetermined threshold;
   an analog frequency converter coupled to the antenna and the local oscillator and configured to output a converted radio signal comprising the first information bearing signal and the second information bearing signal; and
   a digital frequency converter configured to shift the converted radio signal by a frequency approximately equal to the frequency difference between the local oscillator frequency and a center channel frequency.

8. The apparatus of claim 7, wherein a new local oscillator frequency is selected if the local oscillator undergoes a predetermined amount of oscillator drift.

9. The apparatus of claim 7, wherein the channel comprises a television channel; and wherein the local oscillator frequency is further configured such that attenuation of an audio signal of the channel remains below a predetermined attenuation threshold.

10. The apparatus of claim 9, wherein the local oscillator is further configured such that interference from a luma signal of an adjacent channel remains below a predetermined adjacent channel interference threshold.

11. The apparatus of claim 7, wherein the channel occupies a 6 MHz range of radio spectrum between 30 MHz and 900 MHz, and the local oscillator frequency comprises a frequency approximately 0.25 MHz less than a center channel frequency.

12. The apparatus of claim 11, wherein:
the channel comprises an NTSC television channel;
the first signal comprises an luma signal having a carrier frequency 1.25 MHz greater than the lowest frequency of the channel;
the second signal comprises a chroma signal having a carrier frequency approximately 3.58 MHz greater than the carrier frequency of the luma signal; and
the channel further comprises an audio signal having a carrier frequency 4.5 MHz greater than the carrier frequency of the luma signal.

13. The apparatus of claim 12, wherein the image rejection ratio is less than or equal to approximately 57 decibels.

* * * * *